United States Patent [19]
Verner

[11] 3,879,567
[45] Apr. 22, 1975

[54] METHOD OF PREPARING A DRIED HONEY TABLET

[75] Inventor: Reese D. Verner, Phoenix, Ariz.

[73] Assignee: Honey-Tein Products, Inc., Phoenix, Ariz.

[22] Filed: Feb. 11, 1974

[21] Appl. No.: 441,267

[52] U.S. Cl. ............... 426/311; 426/359; 426/380; 426/454; 426/456
[51] Int. Cl. .............................................. A23l 1/08
[58] Field of Search ............ 426/454, 147, 72, 311, 426/380, 359, 185, 187, 357, 192, 215, 217, 455, 453, 456

[56] References Cited
UNITED STATES PATENTS

| | | | |
|---|---|---|---|
| 2,693,420 | 11/1954 | Straub | 426/380 X |
| 3,244,528 | 4/1966 | Torr | 426/359 X |
| 3,357,839 | 12/1967 | Torr | 426/187 |
| 3,780,185 | 12/1973 | Fields | 426/147 X |

Primary Examiner—S. Leon Bashore
Assistant Examiner—Arthur L. Corbin
Attorney, Agent, or Firm—Warren F. B. Lindsley

[57] ABSTRACT

A method of preparing a dried honey composition of matter by admixing and blending a honey containing product comprising a dried composite of honey and a gelatinized starch material with distilled water and isopropyl alcohol which is then screened and mixed with magnesium stearate and formed into non-sticky tablets and wafers.

7 Claims, 1 Drawing Figure

METHOD OF PREPARING A DRIED HONEY TABLET

BACKGROUND OF THE INVENTION

This invention relates to a novel, non-sticky dried honey product in tablet or wafer form and to a process for making the same.

1. Field of the Invention

For many years, honey has been a useful baking ingredient since it possesses certain highly desirable properties which make it an extremely valuable sweetening agent for use in place of or in conjunction with sugar. It contains substantial amounts of levulose and dextrose, which are inert sugars or monosaccharides. The monosaccharides may be characterized as being partially hydrolyzed or predigested, which condition renders them readily assimilatable in the digestive system as contrasted with the disaccharides and polysaccharides. Consequently, honey is a vastly superior food product and nutrient as compared with other natural sugars. In addition, honey is a desirable ingredient in dried or baked products because it contributes a distinctive quality of freshness and moisture as a result of the hygroscopic properties of levulose contained in the honey.

However, in spite of the widespread recognition of the desirability of using honey in dry food products, the sticky, viscous consistency of liquid honey has been a serious objection and has limited the extent of its use.

Prior to my invention it has been difficult to effectively utilize honey in tablet and wafer form for health and diet purposes. Most attempts have resulted in a solid product that rapidly becomes sticky upon contact with atmospheric moisture because of the natural hygroscopic properties of the honey.

Thus, a need exists for an improved tablet or wafer containing dried honey which may be used as a food item for health, diet or baking purposes, which will not become sticky when exposed to the atmosphere, and which can be handled, stored and utilized as other tablet forms of dried ingredients.

2. Description of the Prior Art

This invention is a modification and improvement over the methods and products disclosed in U.S. Pat. Nos. 2,693,420 and 3,780,185.

SUMMARY OF THE INVENTION

In accordance with the invention claimed, a new and improved composition of matter is provided which may be used in different forms to enrich foods with flavor and nutritional values or sued in tablet and wafer form as a diet or food supplement.

It is, therefore, one object of this invention to provide a new and improved composition of matter utilizing, inter alia, dried honey.

Another object of this invention is to provide an improved dry food product including honey in tablet or wafer form.

A further object of this invention is to provide a new and improved composition of matter in tablet or wafer form utilizing dried honey.

A still further object of this invention is to provide a new method for the manufacture of a dried honey product which may be easily controlled and regulated to attain uniform results under efficient methods of operation.

Further objects and advantages of the invention will become apparent as the following description proceeds and the features of novelty which characterize this invention will be pointed out with particularity in the claims annexed to and forming part of this specification.

BRIEF DESCRIPTION OF THE DRAWINGS

The present invention may be more readily described by reference to the accompanying drawing, in which.

DESCRIPTION OF THE PREFERRED EMBODIMENT

Figure 1:
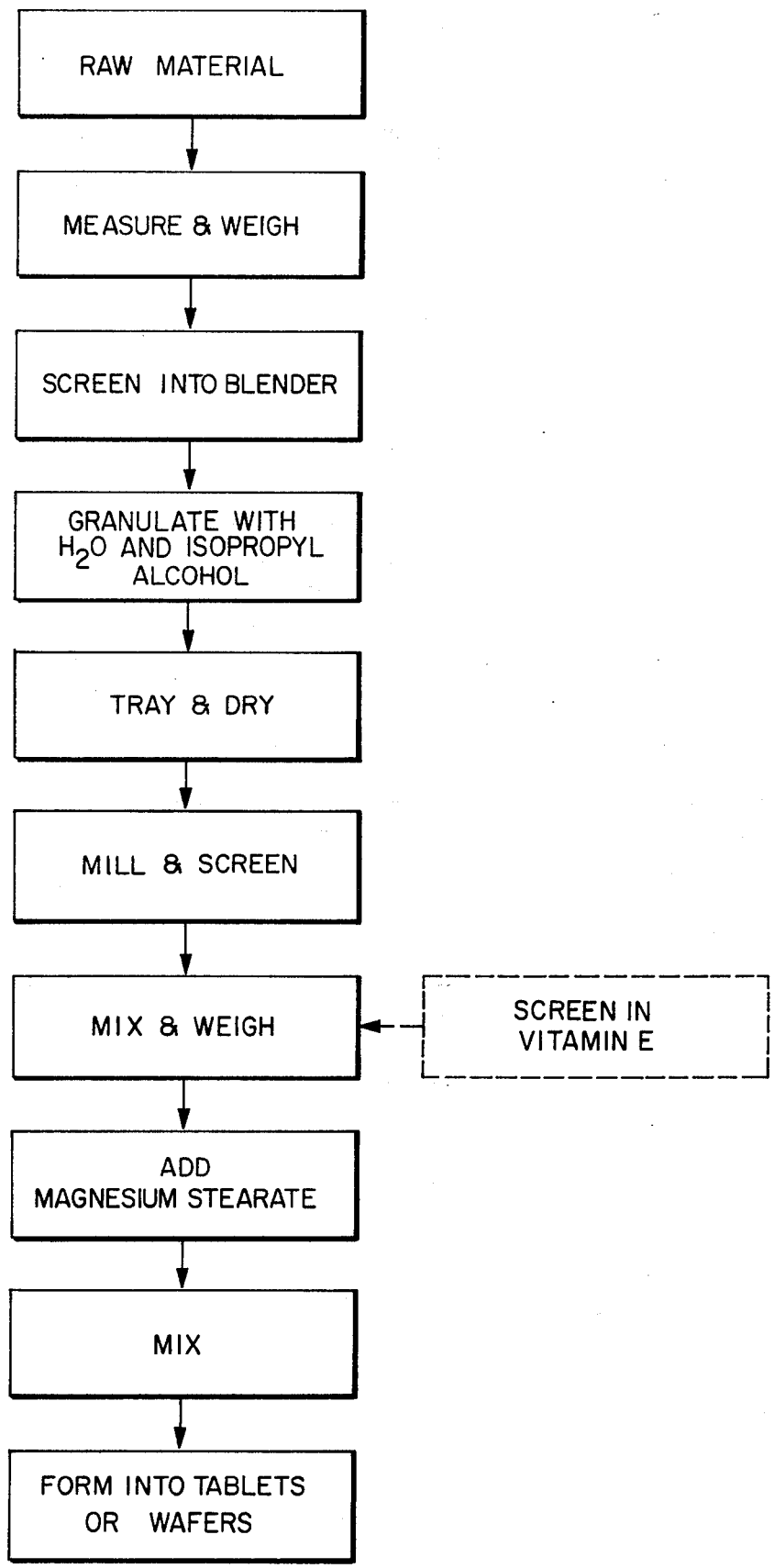
FIG. 1 is a flow diagram for the manufacture of dried honey products in tablet and wafer form and embodying the invention.

Referring more particularly to the drawing by characters of reference, FIG. 1 discloses a flow diagram showing the method or process of making new compositions of matter such as tablets or wafers embodying honey in a concentrated dry state. The method or process disclosed mixes the ingredients in a new way such that the raw materials, when mixed, have a coherency which facilitates packaging and handling. Coherence is influenced by moisture content, temperature and means of applying pressure during packaging. Since many foods tend to expand after removal from a press, thereby reducing cohesiveness, they tend to fall apart. Thus, the method of forming the product is extremely important. This is particularly true where honey is used in forming a powder or granulated product.

In accordance with the teaching of this invention, a honey containing product comprising a dried composite of honey and a gelatinized starch material containing about 45 percent by weight of honey solids is utilized as the raw material. This product is disclosed in U.S. Pat. No. 2,693,420 identified above and available in the market place.

This raw material is measured, weighed and screened into a blender.

In practicing this invention, a mixture of approximately 280 pounds of a dried composition of honey and a gelatinized starch material and approximately 10 pounds of nonfat dried milk is mixed, screened and blended through a 12 to 14 mesh screen, and then granulated with approximately two gallons of distilled water and approximately two gallons of isopropyl alcohol.

The gelatinized starch material is selected from the group consisting of natural starches, modified starches, treated starches and flour as set forth in U.S. Pat. No. 2,693,420. The gelatinized starch contains at least 45 percent by weight of honey solids.

The granulated material is then placed in a tray and dried at approximately 45 degrees Centigrade for a given length of time such as a 12-hour period, or it may be dried in the atmosphere for a given period of time, as desired.

After drying, the material is blended to remove all lumps and milled and passed through a number 3 screen with a 12, 13 or 14 mesh size. The size of particles is designated by microns or mesh. A micron is 0.001 mm. Mesh refers to the number of screen openings per lineal inch. The opening also depends upon the wire size used in making the mesh material.

After passing through a 12, 13 or 14 mesh size screen the material is thoroughly mixed in a blender for approximately twenty minutes, then weighed.

Approximately 280 pounds of this material is then mixed with approximately 1500 grams of magnesium stearate, which is added as a suitable lubricant, and this mixture is again mixed for approximately 5 minutes to form a uniform product. This product is then transmitted to a tablet forming machine in a well known manner for compressing into suitable wafers or tablets, which are packaged for the consumer market.

If it is desired to add a vitamin to the wafer or tablet formed such as, for example, vitamin E, 8,000 to 9,000 grams of this vitamin may be added to the material after the drying step during the mixing and weighing step, as shown in the drawing.

The following products have been found to be commercially acceptable as chewable tablets.

TYPE I—INGREDIENTS

1. Approximately 280 pounds of dried honey and gelatinized starch
2. Approximately 10 pounds of non-fat dried milk
3. Approximately 2 gallons of distilled water
4. Approximately 2 gallons of isopropyl alcohol
5. Approximately 1,500 grams of magnesium stearate

TYPE II—INGREDIENTS

1. Approximately 260 pounds of dried honey and gelatinized starch
2. Approximately 10 pounds of non-fat dried milk
3. Approximately 2 gallons of distilled water
4. Approximately 2 gallons of isopropyl alcohol
5. Approximately 1,500 grams of magnesium stearate
6. Approximately 8,000 to 9,000 grams of a vitamin, such as, for example, vitamin E or any other suitable vitamin Although but a few embodiments of the present invention have been illustrated and described, it will be apparent to those skilled in the art that various changes and modifications may be made therein without departing from the spirit of the invention or from the scope of the appended claims.

What is claimed is:

1. The method of preparing a product embodying honey in a dried form comprising the steps of mixing first ingredients comprising about 280 pounds of a dried composition of honey and a gelatinized starch material with about 10 pounds of non-fat dried milk, blending said first ingredients until they pass through a 12 to 14 mesh screen, sequentially adding about two gallons of water and about 2 gallons of isopropyl alcohol to said first ingredients to granulate said first ingredients, said granulated first ingredients then being dried at approximately 45 degrees Centigrade, blending said granulated first ingredients to remove all lumps, screening said granulated first ingredients through a 12 to 14 mesh screen, mixing said first ingredients with about 1500 grams of magnesium stearate to form second ingredients, and forming said second ingredients into tablet form.

2. The method set forth in claim 1 wherein:
said dried composition of honey and a gelatinized starch material comprises about 45 percent by weight of honey solids.

3. The method set forth in claim 1 wherein:
said starch material of said dried composition of honey is selected from the group consisting of natural starches, modified starches, treated starches and flours.

4. The method set forth in claim 1 wherein:
said granulated first ingredients are dried in a tray for about 12 hours at about 45 degrees Centigrade.

5. The method set forth in claim 1 wherein:
the water used in granulating the first ingredients is distilled water.

6. The method set forth in claim 1 in further combination with the step of:
adding between 8,000 and 9,000 grams of a vitamin to said granulated first ingredients after the drying of said granulated first ingredients.

7. The method set forth in claim 6 wherein:
said vitamin comprises vitamin E.

* * * * *